(12) United States Patent
Racoillet et al.

(10) Patent No.: US 8,443,492 B2
(45) Date of Patent: May 21, 2013

(54) CLAMPING COLLAR HAVING A DIE-STAMPED FASTENING STUD

(75) Inventors: Guillaume Racoillet, Selles sur Cher (FR); Eric Mesnard, Tours en Sologne (FR); Arnaud Jacquelin, Mur de Sologne (FR)

(73) Assignee: Etablissements Caillau, Issy les Moulineaux (FR)

( * ) Notice: Subject to any disclaimer, the term of this patent is extended or adjusted under 35 U.S.C. 154(b) by 513 days.

(21) Appl. No.: 12/455,841

(22) Filed: Jun. 8, 2009

(65) Prior Publication Data
US 2009/0313792 A1   Dec. 24, 2009

(30) Foreign Application Priority Data

Jun. 18, 2008   (FR) ...................................... 08 54007

(51) Int. Cl.
*B65D 63/02*   (2006.01)

(52) U.S. Cl.
USPC ................... 24/20 TT; 24/20 EE; 24/20 CW

(58) Field of Classification Search
USPC ................. 24/20 R, 22, 20 CW, 20 EE, 20 TT
See application file for complete search history.

(56) References Cited

U.S. PATENT DOCUMENTS

| 4,713,863 | A | * | 12/1987 | Jennings | 24/20 R |
| 4,890,360 | A | * | 1/1990 | Calmettes et al. | 24/20 R |
| 4,924,558 | A | * | 5/1990 | Calmettes et al. | 24/20 CW |
| 4,987,652 | A | * | 1/1991 | Spaulding | 24/20 R |
| 5,390,395 | A | * | 2/1995 | Oetiker | 24/20 R |
| 5,459,906 | A | * | 10/1995 | Detable et al. | 24/20 R |
| 5,706,557 | A | * | 1/1998 | Beicht | 24/20 R |
| 5,918,350 | A | * | 7/1999 | Detable et al. | 24/20 TT |
| 6,023,815 | A | * | 2/2000 | Sauer | 24/20 R |
| 6,389,650 | B1 | * | 5/2002 | Yamada et al. | 24/20 R |
| 7,424,769 | B2 | * | 9/2008 | Ogino et al. | 24/20 R |
| 2012/0174343 | A1 | * | 7/2012 | Fouqueray et al. | 24/20 EE |

FOREIGN PATENT DOCUMENTS

| EP | 0 846 906 A1 | 6/1998 |
| GB | 2 235 948 A | 3/1991 |

* cited by examiner

*Primary Examiner* — Robert J Sandy
*Assistant Examiner* — Michael Lee
(74) *Attorney, Agent, or Firm* — Hamre, Schumann, Mueller & Larson, P.C.

(57) ABSTRACT

The collar is made from a metal strip formed into a loop, and has a fastening stud and an ear that project radially. The ear is provided with an aperture into which a free end portion of the stud can be inserted for the purposes of fastening and of tightening the collar. The collar further has engagement surfaces for engaging with a tightening tool, which surfaces project radially and are situated respectively behind the ear and behind the stud. The stud and the engagement surface that is situated behind the stud are formed in a common projection and have side cheeks that are raised relative to the plane of the strip, and that are common to them. The ear is also formed by a projection.

29 Claims, 5 Drawing Sheets

CLAMPING COLLAR HAVING A DIE-STAMPED FASTENING STUD

FIELD OF THE INVENTION

The present invention relates to a clamping collar made from a metal strip formed into a loop, the collar having a fastening stud projecting radially outwards in the vicinity of the first end of the strip and an ear projecting radially outwards in the vicinity of the second end of the strip and provided with an aperture into which a free end portion of the stud can be inserted for the purposes of fastening and of tightening the collar while the ear fits over a foot portion of the stud, the collar further having engagement surfaces for engaging with a tightening tool, which surfaces project radially outwards and are situated respectively behind the ear and behind the stud.

BACKGROUND OF THE INVENTION

A collar of this type is known by U.S. Pat. No. 4,713,863. In that collar, the fastening stud is formed on the top of a first ear, while the aperture into which that stud penetrates for the purpose of performing the fastening is formed in the top of a second ear. Each of those ears is of a generally upside-down L-shape, and they are formed by successive folds that extend transversely over the entire width of the strip. In addition, the height of the ears, as measured from the plane of the strip, is about $\frac{2}{3}^{rds}$ of the radius of the collar. As a result, the ears are very flexible so that the collar presents relatively low overall rigidity. In addition, the large radial height of the ears can constitute a drawback for certain applications, in particular when the collar serves to clamp a rotary part because the center of gravity of the collar is far from the geometrical center of the circle that the strip of the collar forms when said collar is closed.

EP 0 846 906 discloses another collar of the above-mentioned type, in which the fastening stud is formed by a radial double fold that extends transversely over the entire width of the strip. In order to stiffen that double fold, stiffener ribs are formed at the foot of the stud. Unfortunately, the rib that is situated at the back of the stud forms a ramp that hinders bringing a clamping tool of the pliers type into engagement with the foot of the stud. The ear is of a generally upside-down L-shape, and it is formed by a succession of folds that extend transversely over the entire width of the strip. The ear is stiffened in the bend of the L-shape by a rib. That stiffening (at the foot of the stud, and in the bend of the ear) can be insufficient for certain uses. In addition, the ear and the fastening stud present radial height of the order of one half of the radius of the circle formed by the collar when said collar is closed. That very significant radial height might also shift the center of gravity away from the geometrical center of the above-mentioned circle, which poses difficulties as mentioned above when the collar serves to clamp a rotary part.

OBJECT AND SUMMARY OF THE INVENTION

An object of the invention is to improve the above-mentioned state of the art by making provision for the fastening stud to be extremely rigid, without this rigidity being procured to the detriment of the engagement surface situated behind said stud, and while making it possible for the stud to present low radial height.

This object is achieved by the fact that the stud and the engagement surface that is situated behind the stud are formed in a common projection and have side cheeks that are raised relative to the plane of the strip, and that are common to them.

Since the stud is formed in the common projection, it has high rigidity. The projection is obtained by a method of the die-stamping type, rather than by transverse folds extending over the entire width of the strip. As a result, its rigidity is much greater than the rigidity of a shape that is obtained by transverse folding. The stud is attached to the portion of the projection that carries the engagement surface via side cheeks that contribute to a large extent to its rigidity. In addition, since it is formed by a projection, it can be of a small radial height.

Advantageously, the stud has a fastening free end formed by the edge of a cut, the common side cheeks extending on respective sides of the stud between the plane of the strip and one end of the edge of the cut.

The edge of the cut offers a fastening possibility, for fastening in the aperture of the ear, that is both easy and extremely reliable.

Preferably, the collar has side margins extending in the plane of the strip on either side of the common side cheeks.

The presence of said side margins further stiffens the common projection. Preferably, they are of width of approximately at least $\frac{1}{8}^{th}$ of the total width of the strip and preferably in the range $\frac{1}{7}^{th}$ to $\frac{1}{5}^{th}$ of said total width.

Advantageously, the stud has a maximum radial height at the most substantially equal to the maximum radial height of that portion of the common projection in which the engagement surface situated behind the stud is formed, and the common projection is provided with a setback behind the stud and adjacent to said stud.

Thus, the stud is situated within the radial extent of the common projection, and the setback situated behind the stud makes it possible for the front edge of the aperture in the fastening ear to come to be placed in front of the stud, at a height less than the maximum radial height thereof, so as to procure reliable fastening. The stud can thus be formed over a very small radial height.

Advantageously, the ear has a front portion in which the aperture is formed and that comes closer to the plane of the strip than a back portion of the ear. In addition, the aperture of the ear advantageously has a front edge that is situated substantially in the plane of the strip.

Preferably, the ear is formed by an ear projection on either side of which side margins are provided that extend substantially in the plane of the strip. These features also make it possible for the ear to be formed over a very small radial height. In addition, it has considerable stiffness due to it being formed in a projection formed, for example, by die stamping.

An object of the invention is also to provide a clamping collar in which the tightening is obtained by fastening a fastening ear over a radially projecting fastening stud, achieving continuity in the bearing of the collar against the object to be clamped by said collar, even under the ear, in which pre-fastening means are provided that make it possible to close the collar and to hold it in the closed state when the ear is not fastened over the stud, and in which the quantity of material used is limited. In particular, it is a question of preventing the strip having a length that is too long in view of the diameter of the collar.

Thus, in an advantageous embodiment, the first end of the strip has a tab that extends in front of the stud and that is provided with a pre-fastening projecting catch, while the second end of the strip has, behind the ear, a pre-fastening longitudinal slot into which said projecting catch is engaged so as to pre-fasten the collar, and the pre-fastening projecting catch is formed in a free end portion of the tab that has a width smaller than the width of the strip, while the pre-fastening slot extends, going away from the ear, at least to an internal recess suitable for receiving said free end portion of the tab.

The tab serves to procure both the pre-fastening and also the continuity of bearing on the object that is to be clamped. Insofar as the pre-fastening projecting catch is formed at the free end of said tab, said tab can have just the length required for that purpose, with nothing to spare. In addition, in the clamped state, said free end portion of the tab in which the pre-fastening projecting catch is formed comes to engage into the internal recess in order to avoid discontinuity in the bearing at the free end of said tab. By definition, the internal recess has sides that are substantially in the plane of the strip, so that the free end of the tab presents a width that is smaller than the width of the strip in order to fit between said sides.

Advantageously, the pre-fastening projecting catch is formed by a tongue, cut out from the strip and folded out therefrom, and the cutout in which said tongue is formed is offset relative to a middle longitudinal axis of the strip.

Since the pre-fastening projecting catch is cut out in a free end portion of the tab that is of smaller width than the width of the strip, offsetting the above-mentioned cutout relative to a middle axis of the strip makes it possible to form a tongue of length sufficient so that, once folded out, said tongue has the required projecting height, without the edges of the cutout being too close to the longitudinal edges of the tab. The pre-fastening slot can have a relatively large width while remaining centered on the middle longitudinal axis of the strip, so as to receive said offset pre-fastening projecting catch.

However, it is advantageous for the pre-fastening slot also to be offset relative to said longitudinal axis, in the same direction as the cutout in which the tongue is formed. In which case, the width of the pre-fastening strip can be substantially equal to the thickness of the strip, which thickness is also the thickness of the pre-fastening projecting catch so that said slot does not significantly limit the rigidity of the collar.

The invention further provides a method of manufacturing a clamping collar, which method consists in providing a strip of metal, in forming a fastening stud that projects radially outwards in the vicinity of the first end of the strip, in forming an ear that projects radially outwards in the vicinity of the second end of the strip, which ear has an aperture into which a free end portion of the stud can be inserted for the purposes of fastening and of tightening the collar while the stud fits over a foot portion of the stud, in forming engagement surfaces for engaging with a tightening tool, which surfaces project radially outwards and are situated respectively behind the ear and behind the stud, and in forming the strip into a loop.

An object of the invention is to provide a method making it possible to form a collar whose pre-fastening stud can have a low radial height, while also being extremely rigid, and without adversely affecting the quality of the engagement with which the tool engages the engagement surface situated behind said stud. At the same time, said stud and the above-mentioned engagement surface should be formed simply, cheaply, and reliably.

This object is achieved by the fact that, in order to form the stud and the engagement surface that is situated behind the stud, a common projection is formed that has side cheeks that are raised relative to the plane of the strip.

The common projection can be made simply, while having both the stud and the engagement surface situated behind said stud, so that the stud presents high rigidity. In addition, by preserving the above-mentioned side cheeks, it is possible to stiffen the projection further.

Advantageously, after an intermediate common projection has been formed, the common projection is formed by forming the stud in a front portion of said common projection, the engagement surface is formed in a back portion of said projection, and, behind the stud, a setback is formed adjacent to said stud.

Thus, the stud may be formed particularly simply while being extremely rigid.

Advantageously, in order to form the stud, a substantially transverse cut is made in the common projection, so as to define said front and back portions of the projection on either side of the cut.

The edge of the cut situated on the stud side then forms a fastening surface for fastening the corresponding edge of the aperture in the ear, thereby facilitating extremely reliable fastening.

It is also advantageous, in order to form the stud and the engagement surface situated behind the stud, for the front portion of the intermediate common projection to be raised, and for a back end portion of the back portion of the intermediate common projection to be raised while forming, in said back portion, the setback adjacent to the stud.

The common projection may initially be formed over a very low radial height in a first tool pass. In a second pass, it is possible, at the same time, to raise the front portion of the common projection and the back portion of said projection while forming the setback between them. If the above-mentioned cut is present, it may be formed in the same second tool pass.

BRIEF DESCRIPTION OF THE DRAWINGS

The invention can be well understood and its advantages appear more clearly on reading the following description of an embodiment given by way of non-limiting example. The description refers to the accompanying drawings, in which.

MORE DETAILED DESCRIPTION

The clamping collar of the invention is made from a metal strip 1 that is formed into a loop. The metal of the strip is of a conventional type, the strip being cut out, in particular, from a metal sheet suitable for making clamping collars. It can be seen that, even when the collar is in the non-tightened state shown in FIG. 1, the strip is formed into a loop extending over greater than 360°, so that the two ends of said strip overlap. Depending on the diameter of the collar in the tightened state, the angular overlap range can be from 20° (for a diameter of about 100 millimeters (mm) or more) to 90° (for a diameter of about 20 mm).

A fastening stud 10 is formed such that it projects radially outwards in the vicinity of the first end 1A of the strip. A fastening ear 12 is formed such that it projects radially outwards in the vicinity of the second end 1B of the strip.

Below, by convention, it is considered that, for an element situated in an end portion of the strip, the "forward" direction is the direction going from the element in question towards the free end of the end portion in question. Thus, considered relative to the fastening stud 10, the forward direction is indicated by arrow F1, while the "backward" direction is indicated by arrow F2. Similarly, when considering the ear, the forward direction is indicated by arrow G1 and the backward direction is indicated by arrow G2.

Also by convention, it is considered that "the plane of the strip" corresponds to the strip zones that are not deformed outwards or inwards when the strip formed into a loop. Thus, in FIG. 2, the plane of the strip is indicated by a circle C defined by the collar, which circle has a geometrical center O.

Also by convention, the "outward" direction indicates the direction going away from said geometrical center. Thus, the inside face of the strip is the face that faces towards the center O, while the outside face is the face that faces away therefrom.

Figure 4:
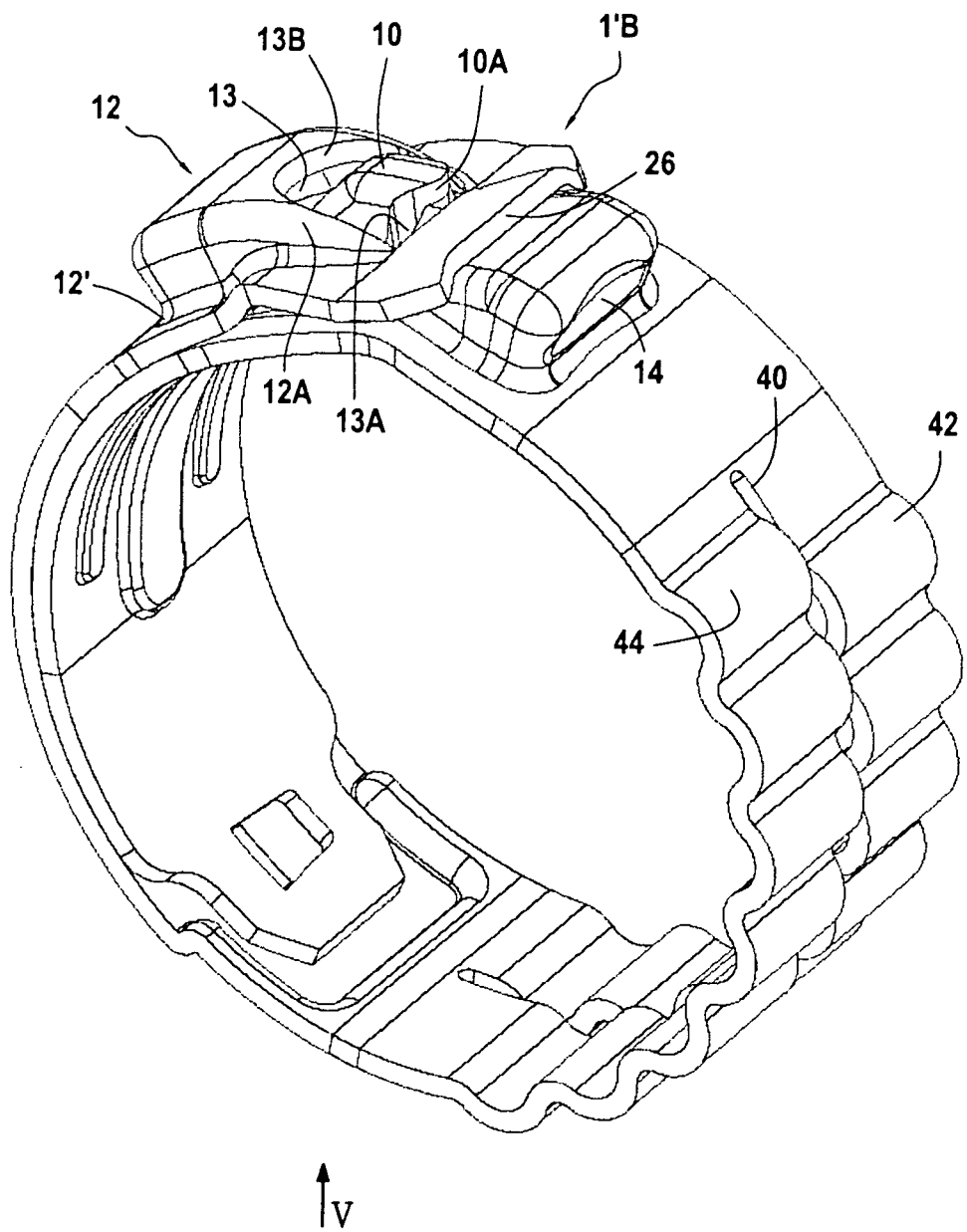
FIG. 4 is a view analogous to FIG. 1, showing the collar in the tightened state.

As can be seen more clearly in FIG. 4, the ear 12 is provided with an aperture 13 into which the stud 10 is inserted when the collar is in the tightened state. In which case, the free edge 10A of the stud co-operates with the front edge 13A of the aperture. It can be seen in FIG. 4 that the aperture 13 has a length, as measured in the longitudinal direction of the strip, that is sufficient so that, in the tightened state, the entire head 10B of the stud 10 passes through said aperture 13. In general, it suffices for a free end portion of the stud to project beyond said aperture, in which end portion the maximum height H of said stud is measured relative to the plane of the strip. In the tightened position shown in FIG. 4, the ear fits over a foot portion 10C of the stud, i.e. considered relative to the ear, said foot portion is situated behind the back edge 13B of the ear.

Figure 2:
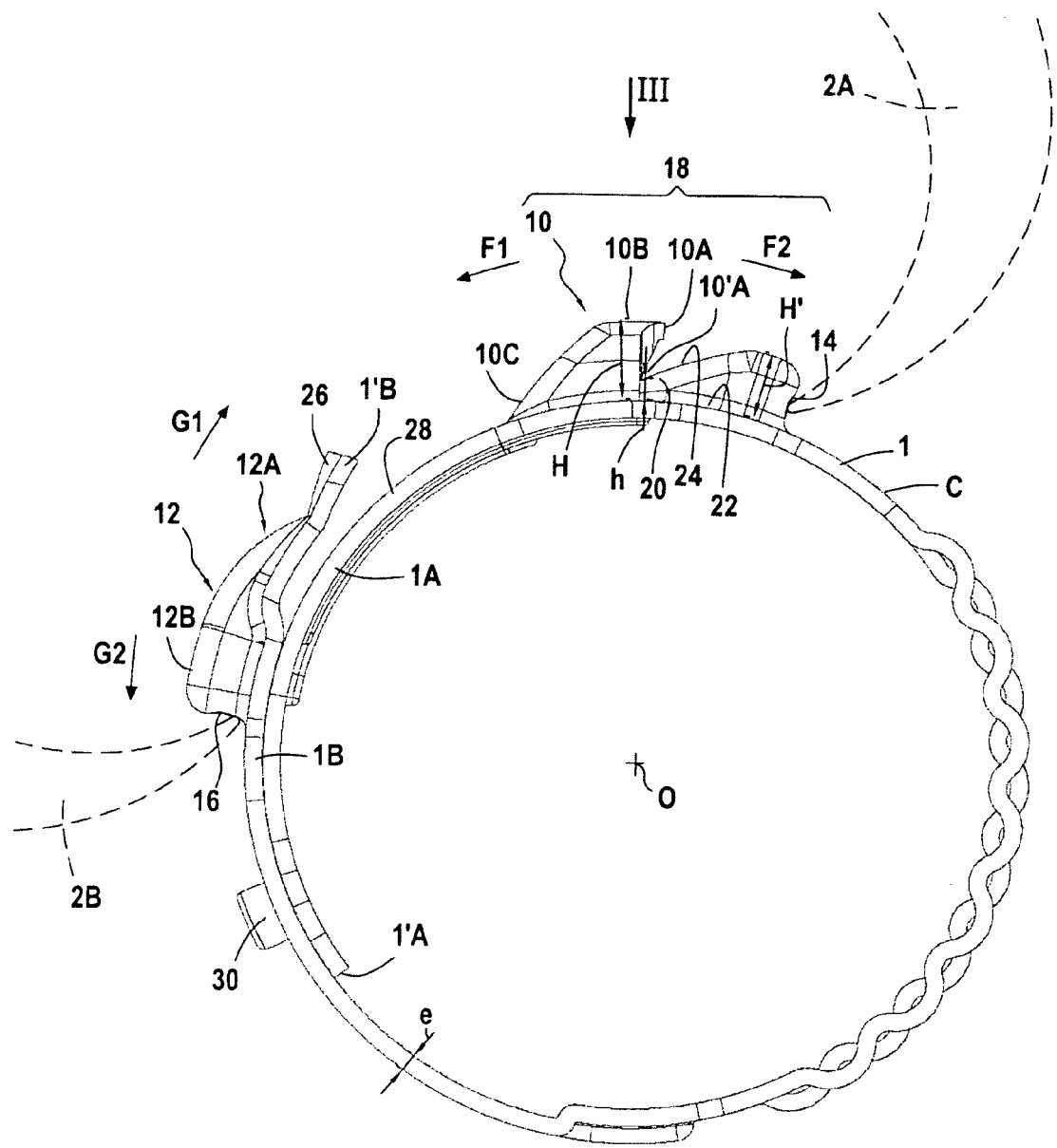
FIG. 2 is a side view of FIG. 1, seen looking along arrow II.

As can be seen more clearly in FIG. 2, the collar has engagement surfaces for engaging with a tightening tool, which surfaces also project radially outwards. Since the tool is, in particular, of the pliers type, its two jaws 2A and 2B are shown in dashed lines. It is thus possible to see a first engagement surface 14 situated behind the stud 10 and a second engagement surface 16 situated behind the ear 12.

The stud 10 and the engagement surface 14 are formed in a common projection 18. They have side cheeks 20 that are raised relative to the plane of the strip and that are common to them. Each of the side cheeks extends over a respective one of the two longitudinal sides of the common projection 18. In FIG. 2, it can be seen that the side cheeks 20 extend over the respective sides of the stud between the plane C of the strip and one end 10'A of the edge of the cut forming the fastening edge 10A of the stud. It can also be seen that the side cheeks extend over a height h that is advantageously of the order of at least substantially ¼ of the maximum height H of the stud, e.g. of the order of ⅓ of said maximum height.

It should be noted that FIG. 2 shows only one of the side cheeks because it is a side view of the collar. The shaping is analogous on the other side since the common projection is symmetrical about the longitudinal middle axis A of the strip, as can be seen in particular in FIG. 3, in which it can also be seen that the ear 12 is also symmetrical about said axis A.

Figure 3:
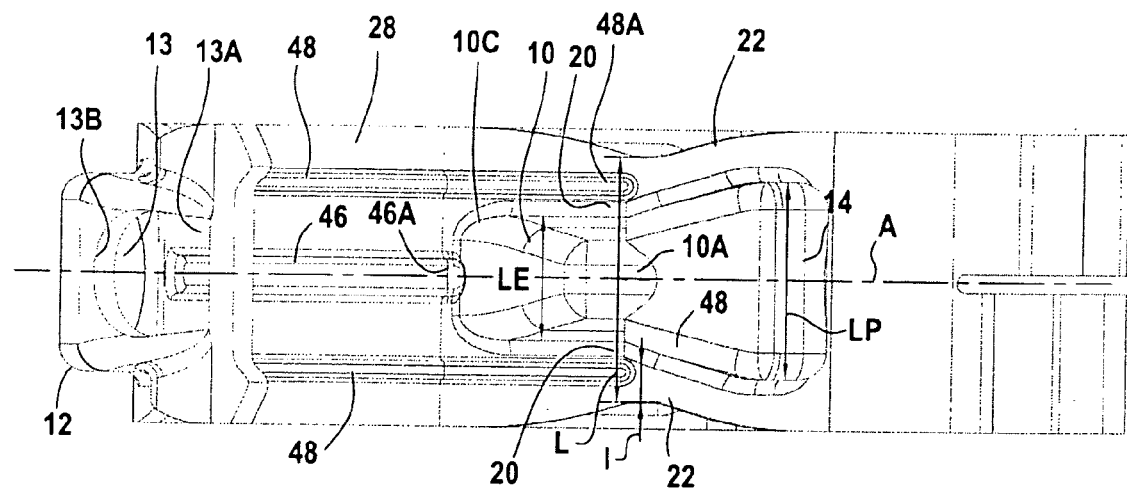
FIG. 3 is a view from above of FIG. 2, seen looking along arrow III.

In FIGS. 2 and 3, it can be seen that the edge of the cut 10A has a convex shape when seen from above. This facilitates fastening on the edge 13A of the aperture 13 in the ear. In FIG. 3, it can also be seen that the collar has side margins 22 that extend on either side of the common side cheeks 20. As can be understood more clearly on observing FIG. 2, said side margins 22 extend in the plane C of the strip. The width l of each side margin 22 is substantially equal to $\frac{1}{7}^{th}$ or more of the width L of the strip, at the place where the measurement is taken. It can be observed in FIG. 3 that, in the central region of the common projection 18, the width of the strip is locally smaller. Thus, the material deformed in order to form the projection has a thickness that is not significantly smaller than the thickness e of the strip. This is particularly important in the middle region of the common projection 18, where the stud 10 meets the back portion of the projection, and where it is particularly important to obtain high rigidity.

It can also be seen in FIG. 3 that the stud 10 is formed in a portion of the common projection 18 that is of smaller width than the tool engagement surface 14 situated behind the stud. In this example, the width LE of the stud 10 is substantially equal to ⅔ of the width LP of the engagement surface 14. This makes it possible to obtain a very wide engagement surface, providing a sufficient engagement area for the tightening tool, while also forming a fastening stud 10 of smaller width, enabling it to fit under the ear 12, which is itself formed by a projection that does not extend over the entire width of the strip.

The engagement surfaces 14 and 16 are dish-shaped, thereby facilitating engagement of the tightening tool of the pliers type.

It can be seen in FIG. 2 that the maximum radial height H of the stud 10 is substantially equal to the maximum radial height H' of the common projection portion 18 in which the engagement surface 14 is formed. The heights H and H' advantageously lie approximately in the range 2 mm to 5 mm, and preferably approximately in the range 2.5 mm to 3 mm for a collar whose strip has a thickness lying approximately in the range 0.6 mm to 0.8 mm. It should be noted that, in order to facilitate the fastening, the height H can be slightly larger than the height H'. In particular, the expression "substantially equal to" covers the fact that H lies in the range H' to 1.3×H', and preferably in the range 1.1×H' to 1.2×H'. In FIG. 2, it can also be seen that the common projection is provided with a setback 24 behind the stud, and adjacent thereto. The bottom of the setback 24 starts radially in register with the free edge 10A of the stud. From this starting point, the setback rises as it extends backwards to the height H'. The setback thus, immediately behind the stud, provides the clearance necessary for the edge 10B of the aperture 13 formed in the ear 12 to come to be placed under the edge 10A of the stud 10. The material remains present in the setback 24 so as to avoid any weakening of the common projection 18, in which the only cut is the incision in the common projection that serves to form the edge 10A of the stud 10.

It can also be seen that the ear 12 has a front portion 12A that is the portion in which the aperture 13 is formed and that is closer to the plane C of the strip than the back portion 12B of the ear. Thus, said back portion 12 is, like the back portion of the projection 18, sufficiently raised relative to the plane of the strip for the engagement surfaces 14 and 16 to present sufficient height, substantially equal to the above-mentioned height H', both for the projection 18 and for the ear 12. However, in its front portion 12A, the ear is tapered to come closer to the plane of the strip, so as to perform the fastening over a minimum radial height. It can be seen that the free end portion 1'B of the second end 1B of the strip has a central portion 26 that is raised slightly, so as to match the slope of the setback 24 and so as to come to fit thereagainst. The width of the raised central portion 26 is slightly larger than the width LE of the stud 10 and corresponds to the width of the outside face of the setback 24, so that, when the ear comes to fit over the stud during the fastening, it is self-centering on said stud, and then on said setback.

The front portion 12A of the ear comes closer to the plane to such an extent that the front edge 13A of the aperture 13 lies substantially in the plane of the strip.

The head 10B of the stud 10 is substantially flat or, more precisely, it has an outside surface that is substantially parallel to the plane of the strip. Thus, a work-hardened zone exists at the boundary between the foot 10C of the stud and its head 10B, and contributes to the rigidity of the stud.

The first end 1A of the strip has a tab 28 that extends in front of the stud. More precisely, said tab 28 extends between the stud 10 and the free end 1'A of the strip. Said tab carries a projecting catch 30 that serves to pre-fasten the collar. Behind the ear, the second end 1B of the strip 1 is provided with a pre-fastening longitudinal slot 32 into which the projecting catch 30 is inserted in order to pre-fasten the collar.

More precisely, said projecting catch 30 is formed in a free end portion 28A of the tab 28, the width LS of which end portion is less than the nominal width LB of the strip. Said nominal width is the ordinary width of the strip in the regions in which its width is not reduced by the presence of the projection, as mentioned above with reference to FIG. 3.

Figure 1:
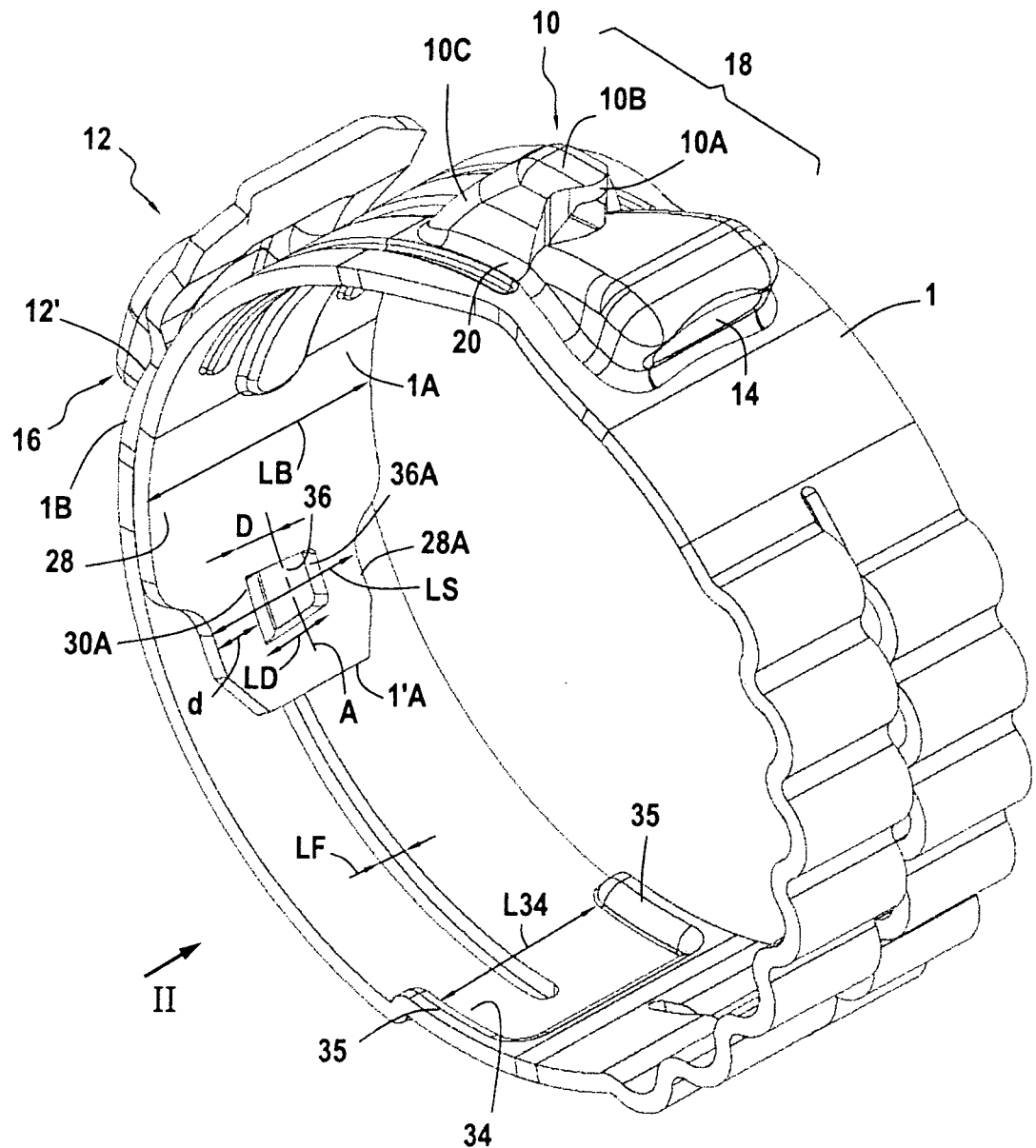
FIG. 1 is a perspective view of the clamp of the invention, in the non-tightened pre-fastened state.
Figure 5:
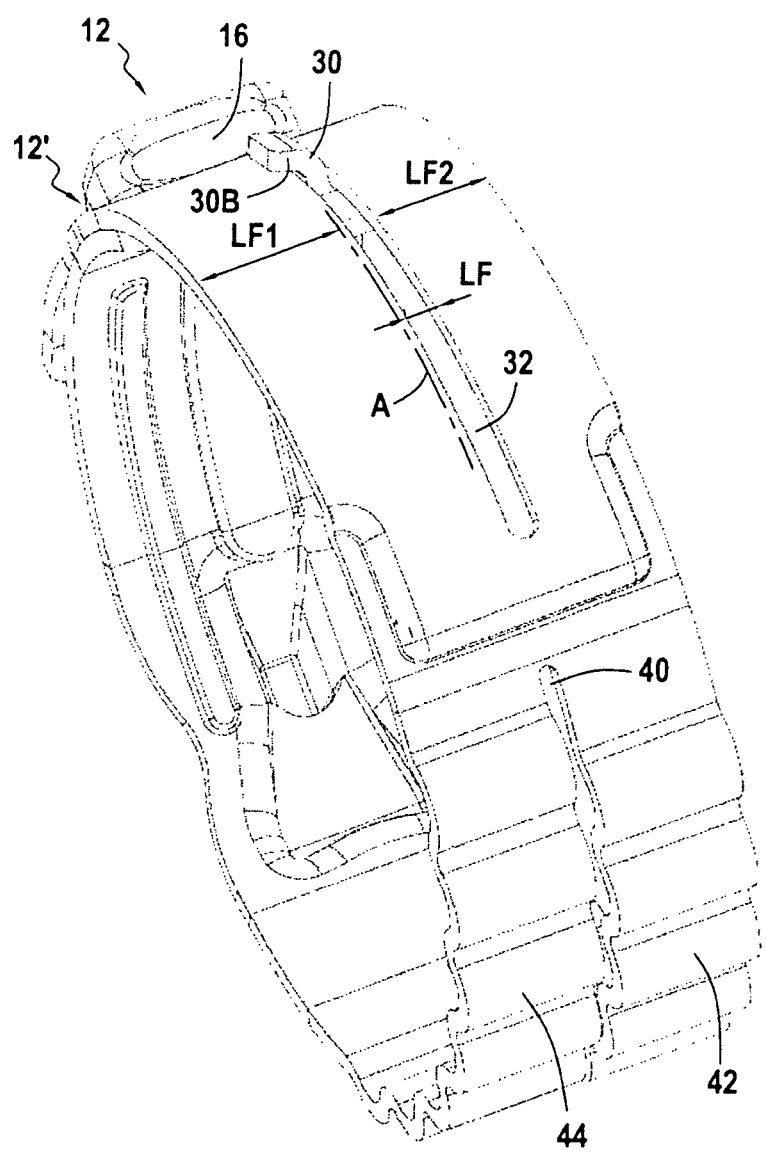
FIG. 5 is a perspective view of the collar of FIG. 4, seen from below, looking along arrow V.

It can be seen in FIGS. 1 and 5 that the pre-fastening slot 32 extends, going away from the ear 12, at least to an internal recess 34. This recess is on the inside face of the collar, facing towards the geometrical center O, while its outline forms a projection on the outside of the strip, as can be seen in FIG. 5. The width L34 of the internal recess 34 is adapted to receive the free end portion 28A of the tab, when the collar is in the tightened state.

The depth of the internal recess 34, as measured radially, is substantially equal to the thickness of the strip, so that, when the free end portion 28A of the tab is disposed in said recess, the inside face of the tab and the inside faces of the margins 35 of the recess 34 are situated on a common circle. Continuity thus exists in the bearing on the object that is to be clamped by the collar.

Since the projecting catch 30 is situated in said free end portion 28, in the immediate vicinity of the free end 1'A of the strip, it is not necessary to extend the tab significantly beyond the projecting catch 30, so that the length of the strip is computed with nothing to spare. The pre-fastening projecting catch 30 is formed by a tongue that is cut out from the strip (the inside face of the corresponding cutout 36 can be seen in FIG. 1). The tongue remains attached to the strip via one its longitudinal edges 30A (see FIG. 1) along which it is folded so that it projects radially outwards. In addition, since the width LF of the slot 32 is substantially equal to the thickness of the strip, i.e. to the width of the foot of the projecting catch 30, the free end 30B of said projecting catch, formed from the tongue, is folded over so as to prevent the projecting catch 30 from retracting inwards out of the slot. The total width LD of the cutout 36 in which the tongue forming the projecting catch 30 is formed is about 3 times the thickness of the strip. In this manner, the length of the tongue in which the projecting catch 30 is formed is sufficient for said tongue to be able to pass through the slot 32 and be folded over at its free end 30B so as to form the projecting catch 30.

The cutout 36 in which the above-mentioned tongue is formed is offset relative to the middle longitudinal axis A of the strip. In other words, that edge 30A of said cutout via which the tongue is attached to the strip does not lie on said axis A, but rather it lies at a distance D from the axis in question. The foot of the projecting catch 30 is thus offset laterally relative to the middle longitudinal axis of the strip. It is thus ensured that, although the cutout 36 is formed in the free end portion 28A of the tab, where the width LS is reduced relative to the nominal width LB of the strip, said cutout does not come too close to the longitudinal edges of the strip. The longitudinal edges 30A and 36A of the cutout 36 are situated at substantially the same distance from the respective longitudinal edges of the strip in the free end portion 28A. This distance lies approximately in the range ¼ of the nominal width LB of the strip to ⅓ of said nominal width. It is thus possible to prevent the presence of the cutout 36 from weakening the strength of the strip in the region in which said cutout is formed.

It can be seen in FIG. 5 that the slot 32 is no longer centered on the middle longitudinal axis A of the strip. The strip widths LF1 and LF2 measured on either side of the slot 32 are not mutually equal. The difference between these two widths is substantially equal to the above-mentioned distance D by which the edge 30A of the cutout 36 is offset. Thus, the pre-fastening serving to hold the collar in the closed state even before it is tightened can be achieved by computing the length of the strip with nothing to spare, and by determining the length LF of the slot 32 in optimum manner, so as to avoid a width that is too large and that would locally weaken the strength of the strip.

In addition, between the common projection 18 and the ear 12, and more precisely between the common projection 18 and the internal recess 34, the strip has a middle slot 40 on either side of which transverse undulations 42, 44 are formed that are in phase opposition. These undulations form waves that project radially relative to the plane of the strip. The crests of the undulations 42 correspond to the troughs of the undulations 44. The undulations form reserves of elasticity or capacity making it possible to increase the length of the collar, once tightened, so as to adapt the tightening force to accommodate the expansions of the object clamped by the collar, in particular under the effect of temperature variations. This configuration in phase opposition makes it possible to avoid discontinuity of bearing under the undulations. In addition, by choosing a large number of wave-shaped undulations (in the range 5 to 10), it is possible to obtain a large reserve of stretchability, while also forming the undulations with a small radial height, e.g. of the same order of magnitude as the above-mentioned heights H and H', i.e. in the range 2 mm to 5 mm, and preferably in the range 2 mm to 3 mm for a collar whose strip has a thickness of in the range 0.6 mm to 0.8 mm.

The ear 12 is formed by an ear projection, on either side of which side margins 12' are provided that lie substantially in the plane of the band. This shaping reinforces the rigidity of the ear. Naturally, the width of the ear, as measured over its inside face, is sufficient for it to be possible for said inside face to fit over the foot of the projection 10. In the method of the invention, the strip of metal 1 is provided, the fastening stud 10 and the ear 12 are formed so that they project radially outwards, said ear is provided with the aperture 13, the engagement surfaces 14 and 16 are formed, and the strip is formed into a loop. It is possible to implement some part of the above-mentioned steps while the strip is flat, or else the strip can be formed into a loop during the formation steps. Preferably, the projections are formed at least in part while the strip is flat, and the longitudinal margins provided on either side of the common projection 18 and on either side of the ear 12 serve as rolling surfaces, facilitating forming the strip into a loop. For forming the stud 10 and the engagement surface 14 situated behind the stud, the common projection 18 is formed that has side cheeks 20 that are raised relative to the plane of the strip.

Figure 6A:
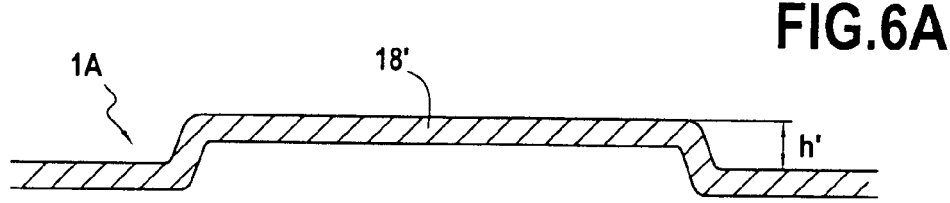
FIGS. 6A and 6B show two successive steps in forming the common projection.
Figure 6B:
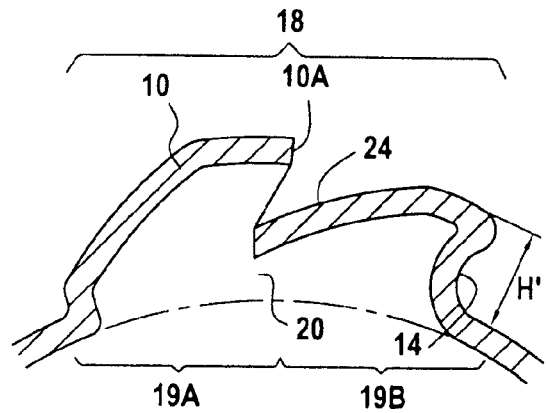

FIGS. 6A and 6B show two successive steps in forming the common projection 18, with the stud 10 and the engagement surface 14. In a first pass, an intermediate common projection 18' is formed over a height h' less than the final height H' of the common projection. From this situation, a front portion of the intermediate common projection 18' is raised so as to form the stud 10, and a back portion of said intermediate common projection is raised so as to form the engagement surface 14, while also providing a setback 24 between the stud 10 and the engagement surface 14. Preferably, the height of the base of the setback 24, which height is the height h of the common side cheeks 20, is substantially equal to the height h' of the intermediate common projection. Thus, in order to form the final common projection, it suffices to raise the front portion of the intermediate projection 18', while forming the cut that serves to provide the fastening edge 10A of the stud, and to raise the back portion of the intermediate common projection 18' progressively, thereby forming the setback 24. The cut forming the fastening edge 10A is formed substantially transversely, except that it can have a convex shape, as can be seen in particular in FIG. 3. The front portion 19A and the back portion 19B of the common projection 18 are defined on either side of said cut. The common projection 18' can be formed while the strip is flat, while the following steps for forming the projection 18 can be formed while the strip is flat or, at least in part, once the strip has already been formed into a loop.

In order to form the pre-fastening projecting catch 30, the cutout 36 is formed, and the resulting tongue is folded out substantially perpendicularly to the plane of the strip. The strip is then rolled up so as to cause said folded-out tongue to pass through the slot, and then the free end portion of the tongue is folded over after the strip has been rolled up.

It should also be noted that, as can be seen in particular in FIG. 3, the tab 28 is provided with longitudinal stiffener ribs. In this example, the ribs are constituted by a central rib 46 aligned on the middle longitudinal axis A of the strip, and by two side ribs 48. In this example, these ribs are formed so as to project on the inside face of the strip. They could also be formed so as to project outwardly. It can be seen that the back end 46A of the central rib 46 that is remote from the free end 1'A of the strip overlaps slightly relative to the foot 10C of the of the fastening stud 10. At the base of said foot, considerable work hardening results from this and reinforces the rigidity of the stud 10. Similarly, the ribs 48 extend backwards, i.e. going away from the free end 1'A, along the side cheeks of the common projection 18. Their back ends 48A are situated slightly beyond the zone in which the cut forming the free edge 10A of the stud is attached to the side cheeks 20. This reinforces the rigidity of said side cheeks, and avoids the risks of tearing on the sides of the cut in question.

In general, the collar of the invention is adapted to any use in which clamping that is effective and simple to implement is sought, together with radial compactness for the collar. The collar can, for example, serve to clamp a pipe onto an endpiece, in an engine compartment of a vehicle, or indeed to clamp a bellows, e.g. a bellows of a steering column. The collar of the invention is particularly adapted to clamping rotary parts such as transmission bellows. The center of gravity of the collar remains very close to the geometrical center of the circle that it forms, and it can be tightened very reliably, by fastening.

What is claimed is:

1. A clamping collar made from a metal strip formed into a loop, comprising:
   a projection disposed at a vicinity of a first end of the metal strip, projecting radially outwards form an outer major surface of the metal strip, the projection having a width that is less than a width of the outer major surface, the projection including:
   a fastening stud projecting radially outwards in the vicinity of the first end of the metal strip,
   a foot portion disposed on a side of the projection towards the first end, and
   a first engagement surface for engaging with a tightening tool, the first engagement surface disposed on a side of the projection away from the first end, wherein the projection has side walls that extend continuously over respective longitudinal sides of the projection, and the side walls form common side cheeks of the fastening stud and the first engagement surface,
   each of the common side cheeks extending radially from the outer major surface, and
   each of the common side cheeks is connected to each of side margins that extend along the outer major surface; and
   an ear disposed at a vicinity of a second end of the metal strip, projecting radially outwards form the outer major surface of the metal strip, the ear having a hole through which a free end portion of the fastening stud can pass so that the fastening stud projects beyond the hole to fasten and tighten the clamping collar while the ear fits over the foot portion, the ear including a second engagement surface for engaging with the tightening tool, the second engagement surface disposed on a side of the second projection away from the second end.

2. The clamping collar according to claim 1, wherein the fastening stud has a fastening free end formed by an edge of a cut, the common side cheeks extending on respective sides of the fastening stud between the outer major surface and one end of the edge of the cut.

3. The clamping collar according to claim 2, wherein, as seen from an outside of the clamping collar in a radial direction towards the radial center, the edge of the cut has a convex shape.

4. The clamping collar according to claim 1, wherein the fastening stud is formed in a portion of the common projection that is narrower than the first engagement surface.

5. The clamping collar according to claim 1, wherein each of the first engagement surface and the second engagement surface has a recessed shape.

6. The clamping collar according to claim 1, wherein the fastening stud has a maximum radial height, at the most, substantially equal to a maximum radial height of that portion of the common projection in which the first engagement surface is formed, and wherein the common projection is provided with a setback positioned away from both the fastening stud and the first end, and adjacent to said fastening stud.

7. The clamping collar according to claim 1, wherein the ear has a front portion directed towards the second end of the metal strip and in which the hole is formed, said front portion is closer to the outer major surface than a back portion of the ear opposite said front portion, so that, when the clamp is tightened, the radial height of the free end portion of the fastening stud is substantially the same as the radial height of the back portion of the ear.

8. The clamping collar according to claim 7, wherein the hole of the ear has a front edge that is directed towards the second end of the metal strip, and situated substantially in the outer major surface.

9. The clamping collar according to claim 1, wherein the fastening stud has a head that has an outside surface substantially parallel to the outer major surface.

10. The clamping collar according to claim 1, wherein the first end of the metal strip has a tab that extends in a direction towards the first end, the tab is positioned between the first end and the fastening stud, the tab is provided with a pre-fastening projecting catch, the second end of the metal strip has a pre-fastening longitudinal slot located away from both the ear and the second end, into which said pre-fastening projecting catch is engaged so as to pre-fasten the clamping collar, the pre-fastening projecting catch is formed in a free end portion of the tab that has a width smaller than the width of the strip, and the pre-fastening slot extends, going away from the ear, at least to an internal recess suitable for accommodating said free end portion of the tab.

11. The clamping collar according to claim 10, wherein the pre-fastening projecting catch is formed by a tongue, cut out from the metal strip and folded out therefrom, and wherein the cutout in which said tongue is formed is offset relative to a middle longitudinal axis of the strip.

12. The clamping collar according to claim 11, wherein the pre-fastening slot is also offset relative to said longitudinal axis, in the same direction as the cutout in which the tongue is formed.

13. The clamping collar according to claim 1, wherein, between the common projection and the ear, the metal strip has a middle longitudinal slot, on either side of which transverse undulations are formed that are in phase opposition.

14. The clamping collar according to claim 1, wherein the ear is formed by an ear projection on either side of which a second set of side margins are provided that extend substantially in the outer major surface.

15. A clamping collar made from a metal strip formed into a loop, the clamping collar comprising:

a fastening stud projecting radially outwards in the vicinity of a first end of the metal strip, the fastening stud having side walls forming common side cheeks that are raised relative to the plane of the metal strip, wherein the side walls extend continuously over respective longitudinal sides of the fastening stud;

an ear projecting radially outwards in the vicinity of a second end of the metal strip and provided with a hole through which a free end portion of the fastening stud can pass so that the fastening stud projects beyond the hole for fastening and tightening the clamping collar while the ear fits over a foot portion of the fastening stud; and first and second engagement surfaces for engaging with a tightening tool, said first and second engagement surfaces projecting radially outwards, the first engagement surface being located on the fastening stud and on an opposite side of the fastening stud with respect to the first end, and the second engagement surface being located in the vicinity of the ear and on an opposite side of the ear with respect to the second end, wherein the first end of the strip has a tab that extends between the fastening stud and a free end of said first end, the first end being provided with a pre-fastening projecting catch, the second end of the strip has, on the opposite side of the ear with respect to the second end, a pre-fastening longitudinal slot into which said pre-fastening projecting catch is engaged so as to pre-fasten the collar, and wherein the pre-fastening projecting catch is formed in a free end portion of the tab that has a width smaller than the width of the strip, and the pre-fastening slot extends, going away from the ear, at least to an internal recess suitable for accommodating said free end portion of the tab.

16. A method of manufacturing a clamping collar, comprising:

providing a strip of metal;

forming a fastening stud that projects radially outwards in the vicinity of a first end of the strip;

forming an ear having an aperture, wherein the ear projects radially outwards in the vicinity of a second end of the strip, the aperture configured for receiving a free end portion of the fastening stud which can be inserted thereto for fastening and tightening the clamping collar while the ear fits over a foot portion of the fastening stud;

forming first and second engagement surfaces for engaging with a tightening tool, which surfaces project radially outwards, the fastening stud being located between the first engagement surface and the first end, and the ear being located between the second engagement surface and the second end; and forming the strip into a loop, wherein, forming the fastening stud and forming the first engagement surface includes:

forming an intermediate common projection, then forming a common projection from the intermediate common projection, wherein a height of the common projection is greater than a height of the intermediate common projection, and the common projection has side cheeks that are raised from an outer major surface of the strip, and then forming the fastening stud in a front portion of said common projection that is closer to the first end, and forming a setback adjacent to said fastening stud on a side thereof that is away from the first end.

17. The method according to claim 16, further comprising:

making a substantially transverse cut in the common projection, so as to define said front portion and a back portion of the projection on either side of the substantially transverse cut, wherein the front portion is between the substantially transverse cut and the first end, and the back portion is away from both the substantially transverse cut and the first end.

18. The method according to claim 17, wherein, when forming the fastening stud and the first engagement surface, raising the front portion of the intermediate common projection, and raising the back portion of the intermediate common projection while forming the setback.

19. The clamping collar according to claim 6, wherein the second end of the strip has a raised central portion, which comes to fit against the setback when the clamping collar is fastened and tightened.

20. The clamping collar according to claim 1, wherein the common side cheeks are side walls that extend continuously over respective longitudinal sides of the common projection.

21. The clamping collar according to claim 15, wherein the free end portion of the fastening stud can pass through the aperture of the ear for fastening and tightening the clamping collar.

22. A clamping collar made from a metal strip formed into a loop, comprising:

a fastening stud projecting radially outwards in the vicinity of a first end of the metal strip;

an ear projecting radially outwards in the vicinity of a second end of the metal strip, the ear having an aperture through which a free end portion of the fastening stud can pass so that the fastening stud projects beyond the aperture for fastening and tightening the clamping collar while the ear fits over a foot portion of the fastening stud;

a first engagement surface and a second engagement surface for engaging with a tightening tool, the first engagement surface and the second engagement surface projecting radially outward, the first engagement surface being disposed on a side of the fastening stud away from the first end, the second engagement surface being disposed on a side of the ear away from the second end, the fastening stud and the first engagement surface being formed in a common projection and having side walls forming common side cheeks that are raised relative to a plane of the metal strip, and the side walls are common to the fastening stud and the first engagement surface, wherein the ear has a front portion directed towards the second end of the metal strip and in which the aperture is formed, said front portion is closer to the plane of the metal strip than a back portion of the ear opposite said front portion, so that, when the clamp is tightened, the radial height of the free end portion of the fastening stud is substantially the same as the radial height of the back portion of the ear, and the aperture of the ear has a front edge that is directed towards the second end of the metal strip, and situated substantially in the plane of the metal strip.

23. The clamping collar according to claim 22, wherein the fastening stud has a fastening free end formed by an edge of a cut, the common side cheeks extending on respective sides of the fastening stud between the plane of the metal strip and one end of the edge of the cut.

24. The clamping collar according to claim 22, further comprising side margins extending in the plane of the metal strip, respectively on each side of the common side cheeks.

25. The clamping collar according to claim 22, wherein the fastening stud has a maximum radial height, at the most, substantially equal to a maximum radial height of that portion of the common projection in which the first engagement surface is formed, and wherein the common projection is provided with a setback positioned away from both the fastening stud and the first end, and adjacent to said fastening stud.

26. The clamping collar according to claim 22, wherein the first end of the metal strip has a tab that extends in a direction towards the first end, the tab is positioned between the first end and the fastening stud, the tab is provided with a pre-fastening projecting catch, the second end of the metal strip has a pre-fastening longitudinal slot located away from both the ear and the second end, into which said pre-fastening projecting catch is engaged so as to pre-fasten the clamping collar, the pre-fastening projecting catch is formed in a free end portion of the tab that has a width smaller than the width of the strip, and the pre-fastening slot extends, going away from the ear, at least to an internal recess suitable for accommodating said free end portion of the tab.

27. The clamping collar according to claim 26, wherein the pre-fastening projecting catch is formed by a tongue, cut out from the metal strip and folded out therefrom, and wherein the cutout in which said tongue is formed is offset relative to a middle longitudinal axis of the strip.

28. The clamping collar according to claim 27, wherein the pre-fastening slot is also offset relative to said longitudinal axis, in the same direction as the cutout in which the tongue is formed.

29. A clamping collar made from a metal strip formed into a loop, comprising:

a fastening stud projecting radially outwards in the vicinity of a first end of the metal strip;

an ear projecting radially outwards in the vicinity of a second end of the metal strip, the ear having an aperture through which a free end portion of the fastening stud can pass so that the fastening stud projects beyond the aperture for fastening and tightening the clamping collar while the ear fits over a foot portion of the fastening stud;

a first engagement surface and a second engagement surface for engaging with a tightening tool, the first engagement surface and the second engagement surface projecting radially outward, the first engagement surface being disposed on a side of the fastening stud away from the first end, the second engagement surface being disposed on a side of the ear away from the second end, the fastening stud and the first engagement surface being formed in a common projection and having side walls forming common side cheeks that are raised relative to the plane of the metal strip, and the side walls are common to the fastening stud and the first engagement surface, wherein the common side cheeks are side walls that extend continuously over respective longitudinal sides of the common projection.

* * * * *